United States Patent
Yao et al.

(10) Patent No.: US 9,945,034 B2
(45) Date of Patent: Apr. 17, 2018

(54) METAL-BASED/DIAMOND LASER COMPOSITE COATING AND PREPARATION METHOD THEREOF

(71) Applicants: ZHEJIANG UNIVERSITY OF TECHNOLOGY, Zhejiang (CN); HANGZHOU BOHUA LASER TECHNOLOGY CO., LTD, Zhejiang (CN)

(72) Inventors: Jianhua Yao, Zhejiang (CN); Bo Li, Zhejiang (CN); Zhijun Chen, Zhejiang (CN); Qunli Zhang, Zhejiang (CN); Xiaodong Hu, Zhejiang (CN); Gang Dong, Zhejiang (CN); Guolong Wu, Zhejiang (CN); Liang Wang, Zhejiang (CN); Volodymyr Kovalenko, Zhejiang (CN)

(73) Assignees: ZHEJIANG UNIVERSITY OF TECHNOLOGY, Zhejiang (CN); HANGZHOU BOHUA LASER TECHNOLOGY CO., LTD, Zhejiang (CN)

( * ) Notice: Subject to any disclaimer, the term of this patent is extended or adjusted under 35 U.S.C. 154(b) by 66 days.

(21) Appl. No.: 15/301,718

(22) PCT Filed: Jul. 1, 2014

(86) PCT No.: PCT/CN2014/081337
§ 371 (c)(1),
(2) Date: Oct. 4, 2016

(87) PCT Pub. No.: WO2015/192396
PCT Pub. Date: Dec. 23, 2015

(65) Prior Publication Data
US 2017/0145568 A1    May 25, 2017

(30) Foreign Application Priority Data

Jun. 18, 2014   (CN) .......................... 2014 1 0277492

(51) Int. Cl.
*C23C 24/10* (2006.01)
*B05B 3/00* (2006.01)
(Continued)

(52) U.S. Cl.
CPC ................ *C23C 24/10* (2013.01); *B05B 3/00* (2013.01); *B23K 26/00* (2013.01); *C23C 24/04* (2013.01)

(58) Field of Classification Search
CPC .......... C23C 24/00; C23C 20/00; B05B 3/00; B23K 26/00
See application file for complete search history.

(56) References Cited

U.S. PATENT DOCUMENTS

| | | | | |
|---|---|---|---|---|
| 5,304,342 A | * | 4/1994 | Hall, Jr. | B01J 3/062 419/11 |
| 2006/0090593 A1 | * | 5/2006 | Liu | B22F 1/0048 75/252 |
| 2014/0234551 A1 | * | 8/2014 | Sparkes | C23C 24/04 427/554 |

FOREIGN PATENT DOCUMENTS

| | | |
|---|---|---|
| CN | 101484263 | 7/2009 |
| CN | 102296289 | 12/2011 |

(Continued)

OTHER PUBLICATIONS

"Influence of process conditions in laser-assisted low-pressure cold spraying", M. Kulmala, P. Vuoristo, Surface & Coatings Technology 202 (2008) 4503-4508.*

(Continued)

*Primary Examiner* — David P Turocy
*Assistant Examiner* — Mohammad Mayy
(74) *Attorney, Agent, or Firm* — JCIPRNET

(57) ABSTRACT

A metal-based/diamond laser composite coating preparation method includes: first selecting high-hardness metal powder and diamond powder of a proper grain size and shape; then (Continued)

uniformly mixing the high-hardness metal powder and diamond powder via a ball-milling method; and finally preparing a composite coating on a substrate by synchronously combining laser texturing technology, laser thermal treatment technology and cold spraying technology. The thickness of the composite coating is greater than 1 mm, and the volume content of diamond in the coating is greater than 45%. A metal-based/diamond laser composite coating is also provided.

9 Claims, 3 Drawing Sheets

(51) Int. Cl.
*B23K 26/00* (2014.01)
*C23C 24/04* (2006.01)

(56) References Cited

FOREIGN PATENT DOCUMENTS

| CN | 102821914 | 12/2012 |
| CN | 103079766 | 5/2013 |
| DE | 102010047020 | 4/2012 |
| KR | 20130111758 | 10/2013 |

OTHER PUBLICATIONS

"Cold-Spraying Coupled to Nano-Pulsed Nd-YaG Laser Surface Pre-treatment" D.K. Christoulis, S. Guetta, E. Irissou, V. Guipont, M.H. Berger, M. Jeandin, J.-G. Legoux, C. Moreau, S. Costil, M. Boustie, Y. Ichikawa, and K. Ogawa, Journal of Thermal Spray Technology vol. 19(5) Sep. 2010, pp. 1062-1073.*

CN (102296289 A), google english translate.*

"International Search Report (Form PCT/ISA/210) of PCT/CN2014/081337", dated Mar. 24, 2015, with English translation thereof, pp. 1-5.

* cited by examiner

METAL-BASED/DIAMOND LASER COMPOSITE COATING AND PREPARATION METHOD THEREOF

CROSS-REFERENCE TO RELATED APPLICATION

This application is a 371 application of an international PCT application serial no. PCT/CN2014/081337, filed on Jul. 1, 2014, which claims priority to and the benefit of China Patent Application No. CN201410277492.9, filed on Jun. 18, 2014, the disclosure of which is incorporated herein by reference in its entirety.

BACKGROUND OF THE INVENTION

1. Field of the Invention

The present invention relates to a field of material surface property modification, in particular, to a high-hardness metal-based/diamond composite coating and a high efficient preparation method thereof.

2. Description of Related Art

A metal ceramic takes advantages of both of a metal and a ceramic, it has low density, high hardness, high abrasion resistance, great thermal conductivity, and does not crack due to rapid temperature decrease or increase. The metal ceramic not only has metallic properties of robustness, high thermal conductivity and great thermal stability of the metal, but also has ceramic properties of high resistance to high temperature, corrosion and abrasion. The metal ceramic mainly includes a sintered aluminium (aluminium-aluminum oxide), a sintered beryllium (beryllium-beryllium oxide), a thoria dispersion (TD) nickel (nickel-thorium oxide) and so forth. A composite material is composed of one or several ceramic phases and metal phases or metal alloys, a generalized metal ceramic further comprises an alloy of a refractory composition, a rigid alloy or a diamond tool material that is bonded to a metal.

Preparation methods of a metal ceramic composite coating often being used include methods of thermal spraying, composite plating, laser in-situ synthesis, self-propagation combustion synthesis, spray welding, plasma transferred welding and so forth. For example, metal ceramic composite coatings of tungsten carbide (WC) base and chromium carbide ($Cr_3C_2$) base are successfully prepared by using a supersonic flame spraying, and have been applied in numbers of industrial fields.

Diamond serves as a highest-hardness natural material, a metal ceramic composite coating applying diamond as a strengthening phase has been widely studied both domestically and abroad, researchers in various countries have launched a large number of exploring researches on an aspect of preparing a metal-based/diamond composite coating.

When preparing the metal-based/diamond composite coating by utilizing methods of thermal spraying, spray welding, plasma transferred welding, laser cladding, self-propagation combustion synthesis and so forth, solid phase diamond particles react with a high temperature molten metal bonding phase, by which a thermal decomposition and dissolution are induced, so that the diamond particles are difficult to be maintained in the coating. Thus, the metal-based/diamond composite coating is not able to be prepared efficiently.

Although the chemical reaction at high temperature occurred in the above-mentioned method are avoided by methods of electroplating and electroless plating, which can maintain the diamond particles in the coating, and a volume content of diamond in the coating can reach 45%. However, a bonding at an interface between diamond and the binding phase is significantly deteriorated while the volume content of diamond in the coating is over 25%. A property of abrasion resistance of the coating is difficult to be improved, while the metal-based/diamond composite coating with thickness over 200 μm is difficult to be prepared by these methods, and a preparation efficiency thereof is low, technics thereof is complicated, and it may cause environment pollution, which make it difficult to be realized in industry.

A method of cold spraying, which has been developed in recent decades, is a new spraying technology realized by a collision between a substrate and low temperature solid particles at high speed that a severe plastic deformation is then occurred, so that a coating is deposited and formed. It avoids from changes of composition, texture and structure that may occur during high temperature deposition of thermal spraying, so that it is suitable for preparing coatings of temperature-sensitive materials (e.g. a nano-material, an amorphous material, and so forth), materials susceptible to oxidation (e.g. aluminum, copper, titanium and so forth) and materials susceptible to phase change (e.g. carbon-based composite materials). Although the metal-based/diamond composite coating can be prepared by the method of cold spraying, the composite coating is prepared mainly by a method of adding diamond to a metal substrate (e.g. aluminum) with relatively low hardness, that a high-hardness metal-based/diamond composite coating is difficult to be prepared, and a bonding between the diamond particles and the metal substrate is relatively weak, which easily results in detachment. In addition, a bonding mechanism between the cold-sprayed coating and the substrate is mainly a mechanical lock that a bonding strength between the coating and the substrate is relatively weak, which easily results in delamination of the coating.

As above, all of the current preparation methods of the metal-based/diamond composite coating have one or several problems as follows: (1) a thickness of the coating is low; (2) a content of diamond in the coating is low; (3) a bonding between diamond and the metallic phase in the coating is weak, which easily results in detachment; (4) the diamond particles in the coating are easily decomposed while being heated; (5) the bonding strength between the coating and the substrate is weak; (6) the metal-based/diamond composite coating is difficult to be prepared.

DISCLOSURE OF THE INVENTION

Technical Problems

Regarding the above-mentioned disadvantages of the conventional preparation technology of the metal-based/diamond composite coating, the present invention provides a composite coating and a high efficient preparation method thereof, in which a metal powder with hardness greater than 50 HRC is utilized as a diamond binding phase, so that problems in the conventional high-hardness metal-based/diamond composite coating preparation technology can be resolved, the problems include low thickness, the diamond particles in the coating are easily detached, the diamond in the composite coating is easily decomposed, a volume content of diamond in the coating is difficult to be greater than 45%, the bonding strength between the coating and the substrate is weak and so forth.

Solution to the Problems

Technical Solution

A preparation method of a metal-based/diamond laser composite coating, comprising steps as follows:

1) Uniformly mixing a high-hardness metal powder and a diamond powder to form a composite powder via a ball-milling method; a hardness of the high-hardness metal powder is greater than 50 HRC, a shape of the high-hardness metal powder is spherical or spherical-like, a powder granularity is 10 μm to 20 μm; the diamond powder is in an irregular shape, a powder granularity is 30 μm to 50 μm;

2) Reducing the composite powder, which has been ball-milled, in a reduction furnace;

3) Performing a pre-treatment on a substrate;

4) Performing a treatment on a surface of the substrate by utilizing a texturing technology of a pulse laser, in order to increase a roughness of the surface; utilizing a cold spraying method assisted with a continuous laser to synchronously deposit the high-hardness metal-based/diamond composite coating on the substrate treated by the pulse laser texturing.

This high-hardness metal-based/diamond composite coating is efficiently prepared by utilizing the laser texturing technology, the laser thermal treatment technology and the cold spraying technology. A feature of the composite coating is that a hardness of the high-hardness metal base is greater than 50 HRC, a thickness of the composite coating is greater than 1 mm, a volume content of diamond in the coating is greater than 45%. In the present invention, a preparation of the composite coating with the high-hardness metal powder as the diamond binding phase is realized, and the bonding strength between the composite coating and the substrate is raised via the pulse laser texturing treatment, a stable and quality metal-based/diamond composite coating with high hardness and abrasion resistance is eventually prepared, and an integration, automation and high efficiency of a substrate surface treatment and coating deposition preparation are realized.

Preferably, the high-hardness metal powder is one or more of a nickel-based powder and a cobalt-based powder. Further preferably, the high-hardness metal powder is Ni55, Ni50, Ni60 or setellite20.

Preferably, in the step 1), utilizing a planetary mixing in the ball-milling method, a ball/powder ratio is 30:1 to 100:1, a ball-milling rotational speed is 200 r/min to 600 r/min, a ball-milling time is 2 h to 24 h, a ball-milling atmosphere is nitrogen gas or argon gas. Otherwise, preferably, utilizing a vibratory mixing in the ball-milling method in the step 1), a ball/powder ratio is 30:1 to 100:1, a vibration frequency is 1200 r/min, a ball-milling time is 20 min to 60 min, a ball-milling atmosphere is nitrogen gas or argon gas.

Preferably, in the step 2), the composite powder is reduced in a muffle furnace, a reducing atmosphere is hydrogen gas, a reducing time is 30 min, a reducing temperature is 200° C. to 400° C.

The substrate is a iron-based material with an arbitrary shape. A method of the pre-treatment on the substrate is a supersonic surface cleaning or a sandblasting roughening.

Preferably, in the step 4), a distance, at which a pulse laser speckle is in front of a sprayed powder speckle, is less than 15 mm, a continuous laser speckle and the sprayed powder speckle is overlapped, an angle between a continuous laser beam and a cold spraying nozzle is 20° to 30°. The pulse laser speckle, the continuous laser speckle and the sprayed powder speckle keep moving synchronously at a moving velocity of 30 mm/s to 50 mm/s.

Further preferably, an energy density of the pulse laser is 104 W/cm$^2$ to 108 W/cm$^2$, a pulse width is 0.5 ms to 2 ms, a wavelength is 1460 nm to 1610 nm. An energy density of the continuous laser of a semiconductor is 3×10$^5$ W/cm$^2$ to 5×10$^5$ W/cm$^2$, a wavelength is 960 nm to 1064 nm, an output power of the continuous laser of the semiconductor is adjusted in real time through a closed loop feedback temperature control mode. A deposition temperature is selected according to a melting point of the high-hardness metal powder, to be lower than the melting point of the metal powder, so as to soften the metal powder but not to melt it.

Further preferably, a technic parameter of a carrier gas pressure of the cold spraying is 2 Mpa to 3 Mpa, a pre-heating temperature of the carrier gas is 300° C. to 600° C., a spraying distance is 15 mm to 40 mm, a powder feeding amount is 40 g/min to 80 g/min, the carrier gas is one of a compressed air and nitrogen gas.

A metal-based/diamond laser composite coating, in which the high-hardness metal powder is utilized to serve as a binding phase of the diamond composite coating; a thickness of the composite coating is greater than 1 mm, a volume ratio of diamond in the coating is greater than 45%.

Advantageous Effect of the Invention

Advantageous Effect

Comparing to the prior art, the present invention has advantageous effects as follows:

(1) The high-hardness metal-based/diamond coating layer related to the present invention is prepared by utilizing a technology based on cold spraying, which maintains a property of low temperature deposition that is originated from cold spraying, avoids the diamond from easily being decomposed and dissolved by a high temperature deposition technology, and significantly raises the content of diamond in the coating;

(2) A preparation method of the high-hardness metal-based/diamond coating related to the present invention synchronously introduces a laser radiation during the process of cold spraying, a heating effect of the laser soften the high-hardness metal powder and the substrate material, which realizes an efficient deposition of the high-hardness metal-based/diamond composite coating. In addition, due to a sufficient plastic deformation of the high-hardness metal powder, it servers as a binding phase that is greatly bonded with diamond, so that the diamond in the coating is not easily detached;

(3) A laser is introduced during cold spraying in the present invention, so that a softening effect on the high-hardness metal powder generated by the laser greatly decreases a critical deposition rate of the high-hardness metal powder, which increases a deposition efficiency of the coating. In addition, due to a property of low temperature deposition that is originated from cold spraying, a thermal stress in the coating is relatively small, and a residual stress in the coating is majorly a compressive stress, so that the coating is not easily cracked. Therefore, as a result of a combination of the softening effect of the laser and the inherent property of the cold spraying, a high efficiency preparation of the high-hardness metal-based/diamond is realized, so that a thickness of the coating is significantly increased;

(4) A pulse laser texturing technology rather than a conventional sandblasting technology is utilized in the present invention to perform the roughening treatment on a surface of the substrate, so that a problem that the surface of the substrate is easily to be contaminated by impurities during the sandblasting treatment is avoided, so that the bonding strength between the high-hardness metal-based/diamond composite coating and the substrate is improved, thus the coating is not easily to be delaminated. Moreover, a treatment of a surface roughness of the substrate and the deposition of the coating are realized as an integrated process, so that an automation, integration and high efficiency of technology and equipment are improved.

(5) The high-hardness metal-based/diamond composite coating of micrometer level can be readily formed on the metal substrate by the technology of the present invention, of which an influence of a substrate heat is little, so that the high-hardness metal-based/diamond composite coating is suitable for high-accuracy repairing and strengthening of parts with thin walls.

BRIEF DESCRIPTION OF THE DRAWINGS

Description of the Drawings

The accompanying drawings are included to provide a further understanding of the invention, and are incorporated in and constitute a part of this specification. The drawings illustrate embodiments of the invention and, together with the description, serve to explain the principles of the invention.

Figure 1:
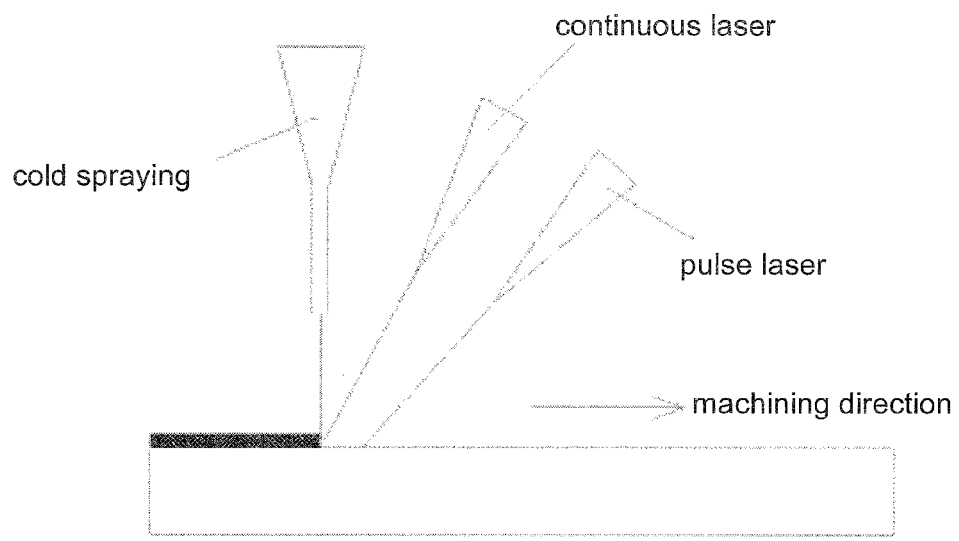
Figure 2:
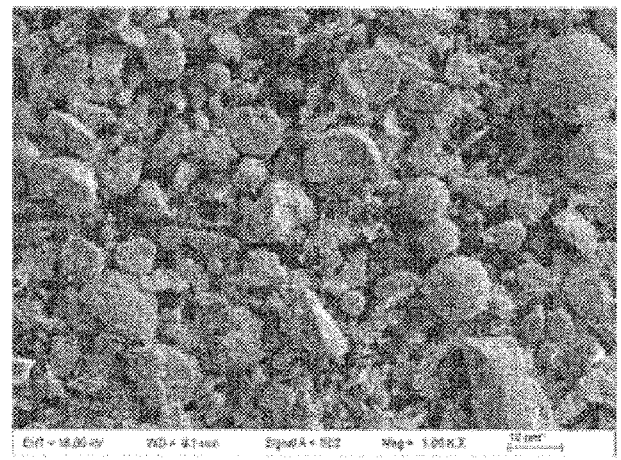
Figure 3:
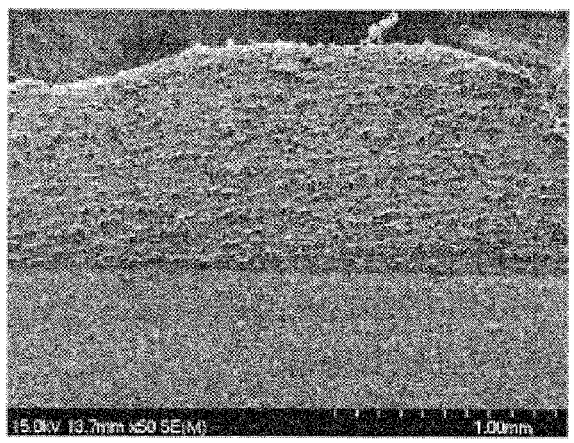
Figure 4:
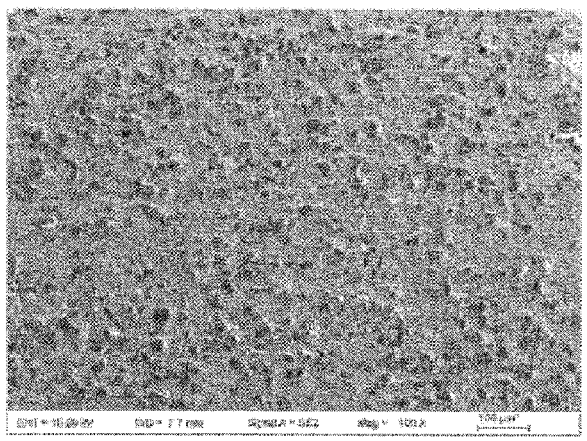
Figure 5:
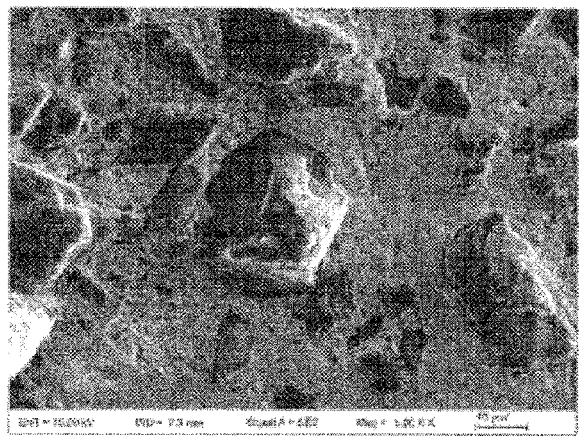
Figure 6:
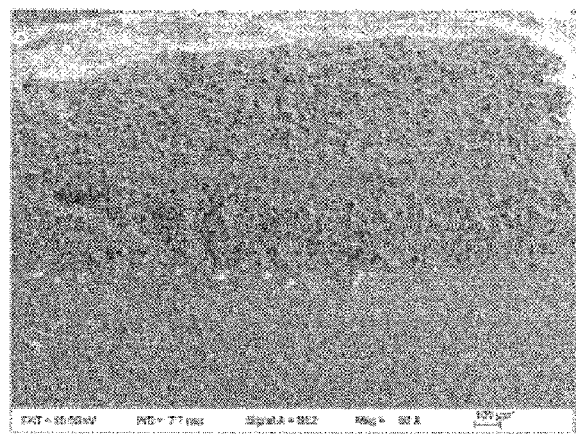
Figure 7:
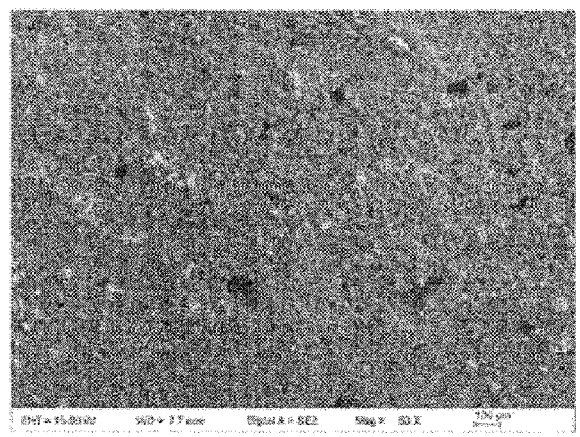
Figure 8:
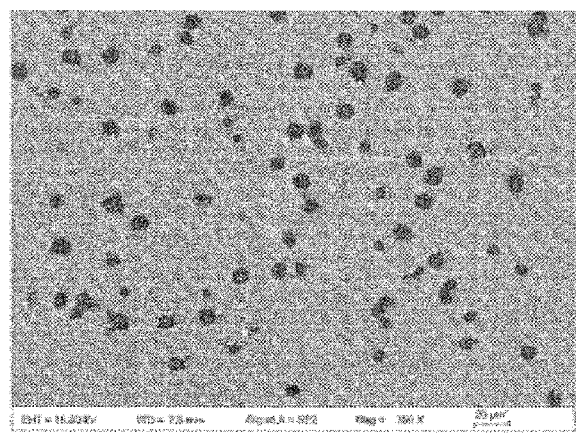

FIG. 1 is a schematic diagram of a preparation method of a coating;

FIG. 2 is a SEM image of a Ni-60 powder and a diamond powder after being ball-milled;

FIG. 3 shows a macro profile of a Ni60-based composite coating added with diamond of 20 wt %;

FIG. 4 shows a micro structure of a Ni60-based composite coating added with diamond of 20 wt %;

FIG. 5 is an image of a combination of the diamond and the Ni60 in the Ni60-based/diamond composite coating;

FIG. 6 shows a macro profile of a Ni60-based composite coating added with diamond of 40 wt %;

FIG. 7 shows a macro morphology of a Ni60-based laser cladding coating added with diamond of 20 wt %;

FIG. 8 shows a cross-sectional micro structure of a Ni60-based laser cladding coating added with diamond of 20 wt %.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The Optimum Embodiment of the Present Invention

Embodiment 1

A Ni60 powder is selected to serve as a binding phase to be mixed with a diamond powder, an average granularity of the Ni60 powder is 18 μm, and a diamond with 400-mesh is selected. The Ni60 powder and the diamond powder at a weight ratio of 4:1 are mixed in a planetary ball-milling machine, a ball/powder ratio is 30:1, a ball-milling speed is 500 r/min, a mixing time is 2 h, and a micro morphology of a composite powder after ball-milling is shown as FIG. 2. A 45# steel plate with 100 mm×50 mm×10 mm is selected as a substrate. A high-hardness metal-based/diamond composite coating is prepared by synchronously utilizing a laser texturing and a cold spraying technology assisted with a laser. A fiber laser is utilized in the laser texturing, an pulse energy density of the laser is 106 W/cm$^2$, a pulse width is 1 ms, and a wavelength is 1510 nm. A spraying carrier gas is a compressed nitrogen gas of 3 Mpa, and a pre-heating temperature of the carrier gas is 500° C. A power of the laser of a semiconductor is adjusted by utilizing a closed loop feedback temperature control mode, and a temperature is controlled at 800° C. A distance between a laser speckle of the texturing treatment and a spraying region is 5 mm, a spraying distance is 40 mm, and a moving velocity of the composite spraying is 30 mm/s.

A macro profile of a Ni60-based/diamond composite coating with diamond content of 20 wt % is shown as FIG. 3, a thickness of the composite coating is greater than 1 mm, and a bonding between the coating and the substrate is great. A volume ratio of the diamond in the coating is greater than 45%. As shown in FIG. 4, the diamond particles are distributed uniformly, the composite coating is dense, and an obvious pore is absent in the composite coating. As shown in FIG. 5, a bonding between the diamond particles and the Ni60-based matrix phase is great because a scan velocity is high, a laser heating temperature is low, and the diamond in the coating is not thermally decomposed, so that a hardness and morphology of the diamond is maintained to the most extent.

An Embodiment of the Present Invention

Embodiment 2

A Ni60 powder is selected to serve as a binding phase to be mixed with a diamond powder, an average granularity of the Ni60 powder is 18 μm, and a diamond with 400-mesh is selected. The Ni60 powder and the diamond powder at a weight ratio of 3:2 are mixed in a vibratory ball-milling machine, a ball/powder ratio is 30:1, a ball-milling time is 60 min, a vibration frequency is 800 r/min, and a stainless steel plate with 100 mm×50 mm×10 mm is selected as a substrate. A high-hardness metal-based/diamond composite coating is prepared by synchronously utilizing a laser texturing and a cold spraying technology assisted with a laser. A fiber laser is utilized in the laser texturing, an pulse energy density of the laser is 106 W/cm$^2$, a pulse width is 1 ms, and a wavelength is 1510 nm. A spraying carrier gas is a compressed nitrogen gas of 3 Mpa, and a pre-heating temperature of the carrier gas is 550° C. A power of the laser of a semiconductor is adjusted by utilizing a closed loop feedback temperature control mode, and a temperature is controlled at 800° C. A distance between a laser speckle of the texturing treatment and a spraying region is 5 mm, a spraying distance is 40 mm, and a moving velocity of the composite spraying is 30 mm/s.

A macro profile of a Ni60-based/diamond composite coating with diamond content of 40 wt % is shown as FIG. 6, a thickness of the coating is greater than 1 mm, and a bonding between the coating and the substrate is great. A volume ratio of the diamond in the coating is greater than 45%, and the diamond is distributed uniformly. The composite coating phase is denser than a cold spraying coating, that an obvious pore is absent in the composite coating. Because a scan velocity is high, a heat accumulated by laser is few, the diamond in the coating is not thermally decomposed, so that a hardness and morphology of the diamond is maintained to the most extent, and an abrasion resistance of the coating is great.

Embodiment 3

A stellite20 powder is selected to serve as a binding phase to be mixed with a diamond powder, an average granularity of the stellite20 powder is 20 μm, and a diamond with 400-mesh is selected. The stellite20 powder and the diamond powder at a weight ratio of 4:1 are mixed in a vibratory ball-milling machine, a ball/powder ratio is 60:1, a ball-milling time is 60 min, a vibration frequency is 1200 r/min, and a 45# steel bar is selected as a substrate. A high-hardness metal-based/diamond composite coating is prepared by synchronously utilizing a laser texturing and a cold spraying technology assisted with a laser. A fiber laser is utilized in the laser texturing, an pulse energy density of the laser is 106 W/cm$^2$, a pulse width is 1.5 ms, and a wavelength is 1640 nm. A spraying carrier gas is a compressed nitrogen gas of 3 Mpa, and a pre-heating temperature of the carrier gas is 600° C. A power of the laser of a semiconductor is adjusted by utilizing a closed loop feedback temperature control mode, and a temperature is controlled at 900° C. A distance between a laser speckle of the texturing treatment and a spraying region is 5 mm, a spraying distance is 30 mm, and a moving velocity of the composite spraying is 30 mm/s.

A thickness of a stellite20-based/diamond composite coating with diamond content of 20 wt % is greater than 1 mm, a bonding between the coating and the substrate is great, a volume ratio of the diamond in the coating is greater than 45%, and the diamond is distributed uniformly. The composite coating phase is denser than a cold-sprayed coating, that an obvious pore and crack are absent in the composite coating. Because a scan velocity is high, a heat accumulated by laser is relatively few, the diamond in the coating is not thermally decomposed, so that a hardness and morphology of the diamond is maintained to the most extent.

Embodiment 4

A stellite20 powder is selected to serve as a binding phase to be mixed with a diamond powder, an average granularity of the stellite20 powder is 20 μm, and a diamond with 400-mesh is selected. The stellite20 powder and the diamond powder at a weight ratio of 3:2 are mixed in a planetary ball-milling machine, a ball/powder ratio is 40:1, a ball-milling speed is 600 r/min, and a mixing time is 1 h. A 17-4PH steel plate with 100 mm×50 mm×10 mm is selected as a substrate. A high-hardness metal-based/diamond composite coating is prepared by synchronously utilizing a laser texturing and a cold spraying technology assisted with a laser. A fiber laser is utilized in the laser texturing, a pulse energy density of the laser is 106 W/cm$^2$, a pulse width is 1.5 ms, and a wavelength is 1640 nm. A spraying carrier gas is a compressed nitrogen gas of 3 Mpa, a pre-heating temperature of the carrier gas is 600° C. A power of the laser of a semiconductor is adjusted by utilizing a closed loop feedback temperature control mode, and a temperature is controlled at 900° C. A distance between a laser speckle of the texturing treatment and a spraying region is 8 mm, a spraying distance is 30 mm, and a moving velocity of the composite spraying is 30 mm/s.

A thickness of a stellite20-based/diamond composite coating with diamond content of 40 wt % is greater than 1 mm, a bonding between the coating and the substrate is great, a volume ratio of the diamond in the coating is greater than 45%, and the diamond is distributed uniformly. The composite coating phase is denser than a cold-sprayed coating, that an obvious pore and crack are absent in the composite coating. Because a scan velocity is high, a heat accumulated by laser is relatively few, an obvious thermal decomposition is absent in the diamond in the coating, so that a hardness and morphology of the diamond are maintained to the most extent.

Embodiment 5

A Ni50 powder is selected to serve as a binding phase to be mixed with a diamond powder, an average granularity of the Ni50 powder is 20 μm, and a diamond with 400-mesh is selected. The Ni50 powder and the diamond powder at a weight ratio of 7:3 are mixed in a planetary ball-milling machine, a ball/powder ratio is 30:1, a ball-milling time is 2 h, and a rotational speed is 400 r/min, such that a composite powder that is uniformly mixed is obtained. A 2Cr13 steel plate with 100 mm×50 mm×10 mm is selected as a substrate. A high-hardness metal-based/diamond composite coating is prepared by synchronously utilizing a laser texturing and a cold spraying technology assisted with a laser. A fiber laser is utilized in the laser texturing, a pulse energy density of the laser is 106 W/cm$^2$, a pulse width is 1.5 ms, and a wavelength is 1640 nm. A carrier gas is a compressed nitrogen gas of 3 Mpa, a pre-heating temperature of the carrier gas is 500° C. A power of the laser of a semiconductor is adjusted by utilizing a closed loop feedback temperature control mode, a temperature is controlled at 800° C. A distance between a laser speckle of the texturing treatment and a spraying region is 8 mm, a spraying distance is 30 mm, and a moving velocity of the composite spraying is 40 mm/s.

A thickness of a Ni50-based/diamond composite coating with diamond content of 30 wt % is greater than 1 mm, a bonding between the coating and the substrate is great, a volume ratio of the diamond in the coating is greater than 45%, and the diamond is distributed uniformly. The composite coating phase is denser than a cold-sprayed coating, that an obvious pore and crack are absent in the composite coating. Because a scan velocity is high, a heat accumulated by laser is relatively few, an obvious thermal decomposition is absent in the diamond in the coating, so that a hardness and morphology of the diamond is maintained to the most extent.

Embodiment 6 (Comparative Example)

A Ni60 powder is selected to serve as a binding phase to be mixed with a diamond powder, an average granularity of the Ni60 powder is 18 μm, and a diamond with 400-mesh is selected. The Ni60 powder and the diamond powder at a weight ratio of 4:1 are mixed in a planetary ball-milling machine, a ball/powder ratio is 30:1, a ball-milling rate is 100 r/min, and a mixing time is 0.5 h. A 45# steel plate with 100 mm×50 mm×10 mm is selected as a substrate, which includes a surface that is subject to a treatment of degreasing and rust-removing by utilizing a sandblasting technology, a white corundum with 24-mesh is utilized in the sandblasting, and a sandblasting pressure is 0.8 Mpa. A metal-based/diamond composite coating is prepared by utilizing a laser cladding technology, of which technic parameters include: a laser power is 1.2 kW, a cladding velocity is 10 minis, a powder feeding rate is 15 g/min, and argon gas is utilized to protect coaxial powder feeding cladding.

A micro structure of the Ni60-based/diamond composite coating with diamond content of 20 wt % is shown as FIG. 7, a surface morphology of the cladding coating is shown as FIG. 8. Obviously, an ablation and carbonization of the diamond is severe during the process of cladding, a surface of the coating has obvious pores, and is loose. Comparing to the coating with diamond content of 20 wt % synchronously prepared by laser texturing and cold spraying technology assisted with the laser, a diamond content in the cladding coating is obviously decreased, and the diamond is ablated into a spherical shape in a melting pool of cladding, and the diamond in the coating is severely carbonized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A preparation method of a metal-based/diamond laser composite coating, comprising steps as follows:
    1) uniformly mixing a high-hardness metal powder and a diamond powder to form a composite powder via a ball-milling method; a hardness of the high-hardness metal powder is greater than 50 HRC, a shape of the high-hardness metal powder is spherical or spherical-like, a granularity of the high-hardness metal powder is 10 μm to 20 μm; the diamond powder is in an irregular shape, and has a granularity of 30 μm to 50 μm;
    2) reducing the composite powder being, which has been ball milled, in a reduction furnace;
    3) performing a pre-treatment on a substrate;
    4) performing a treatment on a surface of the substrate by utilizing a texturing technology of a pulse laser, in order to increase a roughness of the surface; utilizing a cold spraying method assisted with a continuous laser to synchronously deposit a high-hardness metal-based/diamond composite coating on the substrate treated by the pulse laser texturing, wherein, a distance, at which a pulse laser speckle is in front of a sprayed powder speckle in step 4), is less than 15 mm, a continuous laser speckle and the sprayed powder speckle is overlapped, an angle between a continuous laser beam and a cold spraying nozzle is 20° to 30°, the pulse laser speckle, the continuous laser speckle and the sprayed powder speckle keep moving synchronously at a moving velocity of 30 mm/s to 50 mm/s.

2. The preparation method of the metal-based/diamond laser composite coating as claimed in claim 1, wherein the high-hardness metal powder is one or more of a nickel-based powder and a cobalt-based powder.

3. The preparation method of the metal-based/diamond laser composite coating as claimed in claim 1, wherein utilizing a planetary mixing in the ball-milling method in the step 1), a ball/powder ratio is 30:1 to 100:1, a ball-milling rotational speed is 200 r/min to 600 r/min, a ball-milling time is 2 h to 24 h, a ball-milling atmosphere is nitrogen gas or argon gas.

4. The preparation method of the metal-based/diamond laser composite coating as claimed in claim 1, wherein utilizing a vibratory mixing in the ball-milling method in the step 1), a ball/powder ratio is 30:1 to 100:1, a vibration frequency is 1200 r/min, a ball-milling time is 20 min to 60 min, a ball-milling atmosphere is nitrogen gas or argon gas.

5. The preparation method of the metal-based/diamond laser composite coating as claimed in claim 1, wherein the composite powder is reduced in a muffle furnace, a reducing atmosphere is hydrogen gas, a reducing time is 30 min, a reducing temperature is 200° C. to 400° C.

6. The preparation method of the metal-based/diamond laser composite coating as claimed in claim 1, wherein the substrate is an iron-based material with an arbitrary shape, a method of the pre-treatment on the substrate is a supersonic surface cleaning.

7. The preparation method of the metal-based/diamond laser composite coating as claimed in claim 1, wherein an energy density of the pulse laser is 104 W/cm$^2$ to 108 W/cm$^2$, a pulse width is 0.5 ms to 2 ms, a wavelength is 1460 nm to 1610 nm, an energy density of the continuous laser of a semiconductor is $3\times10^5$ W/cm$^2$ to $5\times10^5$ W/cm$^2$, a wavelength is 960 nm to 1064 nm, an output power of the continuous laser of the semiconductor is adjusted in real time through a closed loop feedback temperature control mode, a deposition temperature is selected according to a melting point of the high-hardness metal powder, to be lower than the melting point of the metal powder, so as to soften the metal powder but not to melt it.

8. The preparation method of the metal-based/diamond laser composite coating as claimed in claim 1, wherein a technic parameter of a carrier gas pressure of the cold spraying is 2 Mpa to 3 Mpa, a pre-heating temperature of the carrier gas is 300° C. to 600° C., a spraying distance is 15 mm to 40 mm, a powder feeding amount is 40 g/min to 80 g/min, the carrier gas is one of a compressed air or nitrogen gas.

9. The preparation method of the metal-based/diamond laser composite coating as claimed in claim 1, wherein the high-hardness metal powder is utilized to serve as a binding phase of the diamond composite coating; a thickness of the composite coating is greater than 1 mm, and a volume content of diamond in the coating is greater than 45%.

* * * * *